US 6,708,947 B1

(12) United States Patent
Bircann

(10) Patent No.: US 6,708,947 B1
(45) Date of Patent: Mar. 23, 2004

(54) HYSTERESIS REDUCTION IN AN EXHAUST GAS RECIRCULATION VALVE

(75) Inventor: Raul A. Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/355,965

(22) Filed: Jan. 31, 2003

(51) Int. Cl.[7] .............................................. F16K 31/102
(52) U.S. Cl. ...................................... 251/129.2; 251/76
(58) Field of Search ....................... 251/64, 76, 129.01, 251/129.22

(56) References Cited

U.S. PATENT DOCUMENTS

| | | | | |
|---|---|---|---|---|
| 3,707,992 A | * | 1/1973 | Ellison et al. .......... | 251/129.15 |
| 5,035,360 A | * | 7/1991 | Green et al. ............ | 251/129.09 |
| 5,203,538 A | * | 4/1993 | Matsunaga et al. ..... | 251/129.19 |
| 5,328,100 A | * | 7/1994 | Bergstrom et al. ...... | 251/129.21 |
| 5,579,741 A | * | 12/1996 | Cook et al. ............. | 251/129.15 |
| 5,626,325 A | * | 5/1997 | Buchanan et al. ...... | 251/129.14 |
| 5,947,442 A | * | 9/1999 | Shurman et al. ........ | 251/129.19 |
| 6,032,925 A | * | 3/2000 | Izuo et al. .............. | 251/129.19 |
| 6,279,524 B1 | * | 8/2001 | Schebitz ................. | 251/129.01 |

* cited by examiner

*Primary Examiner*—Paul J. Hirsch
(74) *Attorney, Agent, or Firm*—Patrick M. Griffin

(57) ABSTRACT

A solenoid actuator for an exhaust gas recirculation valve assembly including a resiliently-deformable element, for example, an undulated washer, disposed between the closed end of an armature guide tube and an axial face of the primary pole piece. The resilience of the element is selected to prevent sliding of the guide tube within the pole piece due to frictional drag on the tube by an armature; to absorb and store kinetic energy transferred by the armature impacting the closed end of the guide tube; and to reduce hysteresis by returning stored energy to assist the armature in accelerating in the reverse direction. The element may take any of several forms.

10 Claims, 5 Drawing Sheets

HYSTERESIS REDUCTION IN AN EXHAUST GAS RECIRCULATION VALVE

TECHNICAL FIELD

The present invention relates to exhaust gas recirculation valves for internal combustion engines; more particularly, to solenoid actuators for such valves; and most particularly, to resilient means for reducing hysteresis in the response of such actuators.

BACKGROUND OF THE INVENTION

Exhaust recirculation valves for internal combustion engines are well known. Such a valve typically includes a poppet-type valve mechanism actuated linearly by an electric solenoid in response to signals from an engine control module. The solenoid includes a central armature attached to the valve poppet. The armature is actuated by being drawn axially of primary and secondary electromagnetic pole pieces. Typically, the armature slides within, and is guided by, a non-ferromagnetic tube which also functions as a virtual "air gap" to enhance the axial force on the armature. The tube is pressed into the pole pieces and ideally remains stationary while the armature is reciprocated within. However, because of manufacturing tolerances, the axial space allotted for the guide tube must be slightly longer than the tube itself such that typically a small gap exists at one end or the other of the tube. Thus, in prior art solenoids, the tube undesirably may be moved axially of the pole pieces due to friction with the moving armature during the duty cycle of the armature.

The tube may be provided as a cup-shaped element having a blind end against which the armature instantaneously comes to rest before reversing its motion. This hard stop for the armature can result in undesirably rapid wear of the stop surface and of the armature itself. The impact force in an automotive solenoid may exceed 100 or more times the force of gravity. Further, because the guide and armature share very close tolerances and cannot be perfectly cylindrical, and because the closed end of the tube may be deformed from cylindrical ideality by the deep-drawing process for forming the tube, the armature typically tends to stick slightly as it approaches the blind end of the tube within the primary pole piece. Also, a phenomenon known in the art as "magnetic latching" can cause the armature to stick, momentarily, against the pole piece. These occurrences can cause undesirable hysteresis in the duty cycle of the armature.

What is needed is a means for softening the impact of the armature against the inward stop of the guide tube, for preventing the guide tube from slipping axially of the pole pieces, and for reducing hysteresis in the duty cycle of the armature.

It is a principal object of the present invention to reduce hysteresis in the duty cycle of a solenoid armature, thereby improving position control of an attached poppet valve.

It is a further object of the invention to prevent the guide tube from slipping axially within the pole pieces of a solenoid.

It is a still further object of the invention to soften the impact of the armature against the inward stop of the guide tube to extend the working life of the solenoid.

SUMMARY OF THE INVENTION

Briefly described, a solenoid assembly in accordance with the invention includes a Hookian-like deformable element, for example, an undulated washer, disposed between the closed end of an armature guide tube and the primary or inward pole piece. The element is resilient and has a spring constant selected to 1) prevent axial motion of the guide tube due to frictional drag on the solenoid armature moving within the guide tube; 2) absorb and store a large percentage of the kinetic energy transferred by the armature impacting the end of the guide tube and reversing its motion; and 3) resiliently return a percentage of the stored energy to assist the armature in accelerating in the reverse direction. The element may take the form, for example, of a wavy-washer, a resilient mesh ring, or circular corrugation formed in the end of the tubular guide itself.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
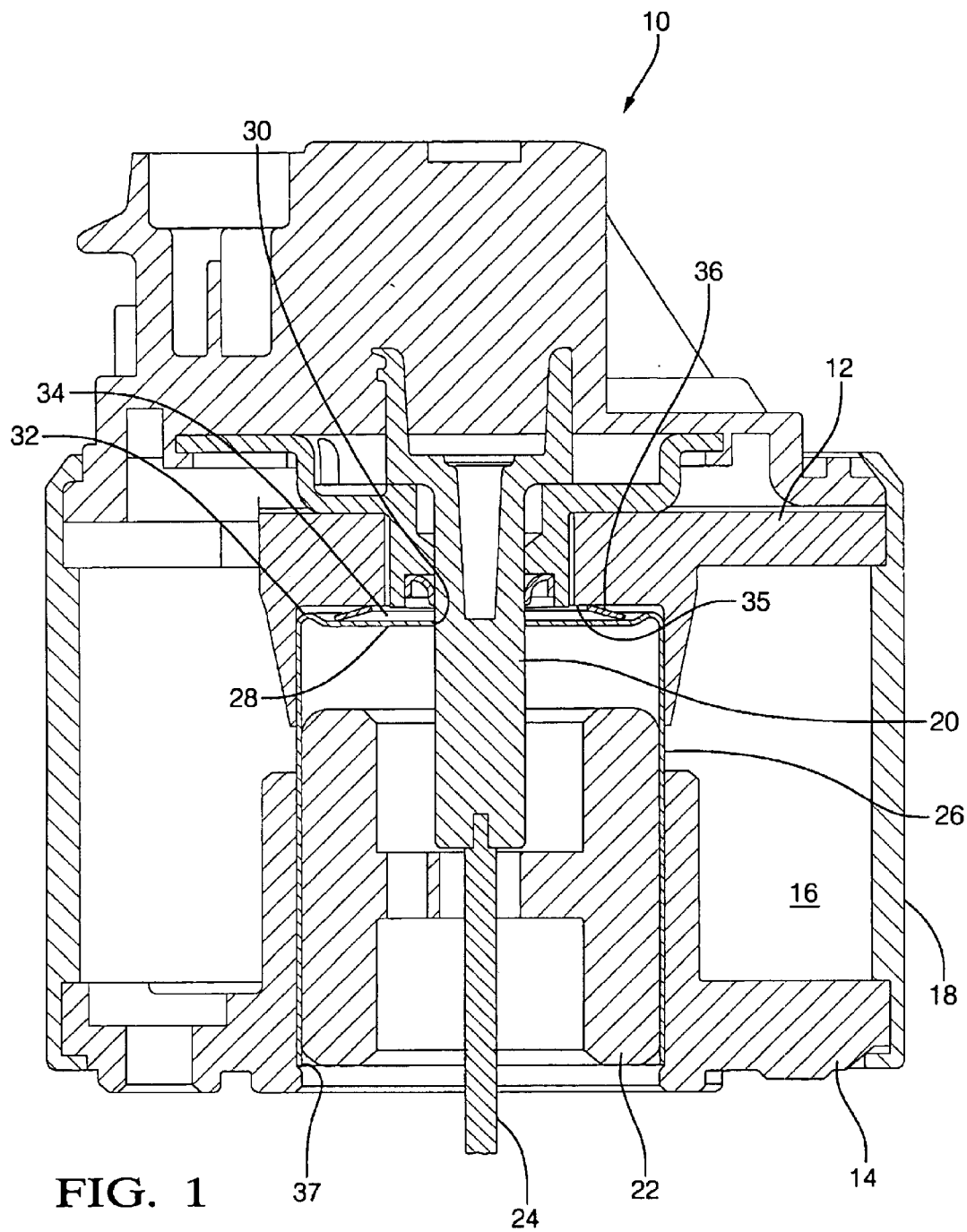
FIG. 1 is a elevational cross-sectional view of a first embodiment of a solenoid in accordance with the invention.

Referring to FIG. 1, a solenoid valve actuator 10 in accordance with the invention, such as may be incorporated in, for example, an automotive exhaust gas recirculation valve, includes in known fashion a primary pole piece 12, a secondary pole piece 14, windings 16, a housing 18, a guide tube 20 disposed axially within the pole pieces 12,14, and an armature 22 slidingly disposed within guide tube 20. Also shown is a poppet valve stem 24 and an electronic position sensor shaft 26 axially moveable by stem 24 and armature 22 to sense the axial position thereof.

Guide tube 20 is formed of a non-ferromagnetic material such as stainless steel, as by deep drawing in known fashion, and further includes a closed bottom portion 28 having a central opening 30 for receiving sensor shaft 26 therethrough. Bottom portion 28 preferably is formed having a raised corrugated rim 32, defining thereby an annular space 34 between bottom portion 28 and primary pole piece 12. At the end of its stroke, armature 22 impacts bottom portion 28, the load being transferred to first pole piece 12 via rim 32 which, in the prior art, is urged against pole piece 12 by the impact of the armature. As noted above, such force may exceed 100 G; and further, armature 22 is known to tend to become frictionally stuck in the guide tube against bottom portion 28 and to be hindered from returning linearly therefrom in the return stroke; and further, friction between tube 20 and armature 22 can cause tube 20 to be undesirably moved axially along with the armature during part of the armature cycle.

Within space 34 and in contact with both bottom portion 28 and axial face 35 of pole piece 12 is disposed an axially resilient element 36 which may take any of several forms. The primary purpose of element 36 is to provide shock absorption for the impact of armature 22 on tube bottom 28. Because bottom 28 is somewhat axially resilient itself as afforded by corrugated rim 32, element 36 allows a relatively soft impact of the armature against the bottom. Impact force reductions exceeding 75% have been observed. Because the intensity of impact is highly attenuated, there is reduced tendency for the armature to stick in the tube. Further, the energy absorbed in the resilient element and tube bottom is available to assist in spring-accelerating the armature in the reverse direction on the return stroke, this being a secondary purpose of element 36. Further, element 36 is sized such that tube 20 is urged axially against tube stop 37 and is prevented from being moved axially by friction with armature 22, this being a third purpose of element 36.

In a currently preferred embodiment, element 36 comprises a wavy or undulated washer element; that is, a planar washer blank formed of spring steel or other suitable material which has been deformed into one or more axial-direction undulations angularly distributed about a center. The undulations are axially compressible to absorb the shock of armature impact. In its simplest form, element 36 is a Belleville washer, which may be considered as having a half-wave undulation. Preferably, a plurality of undulations is employed in an undulating washer element in accordance with the invention.

Figure 2:
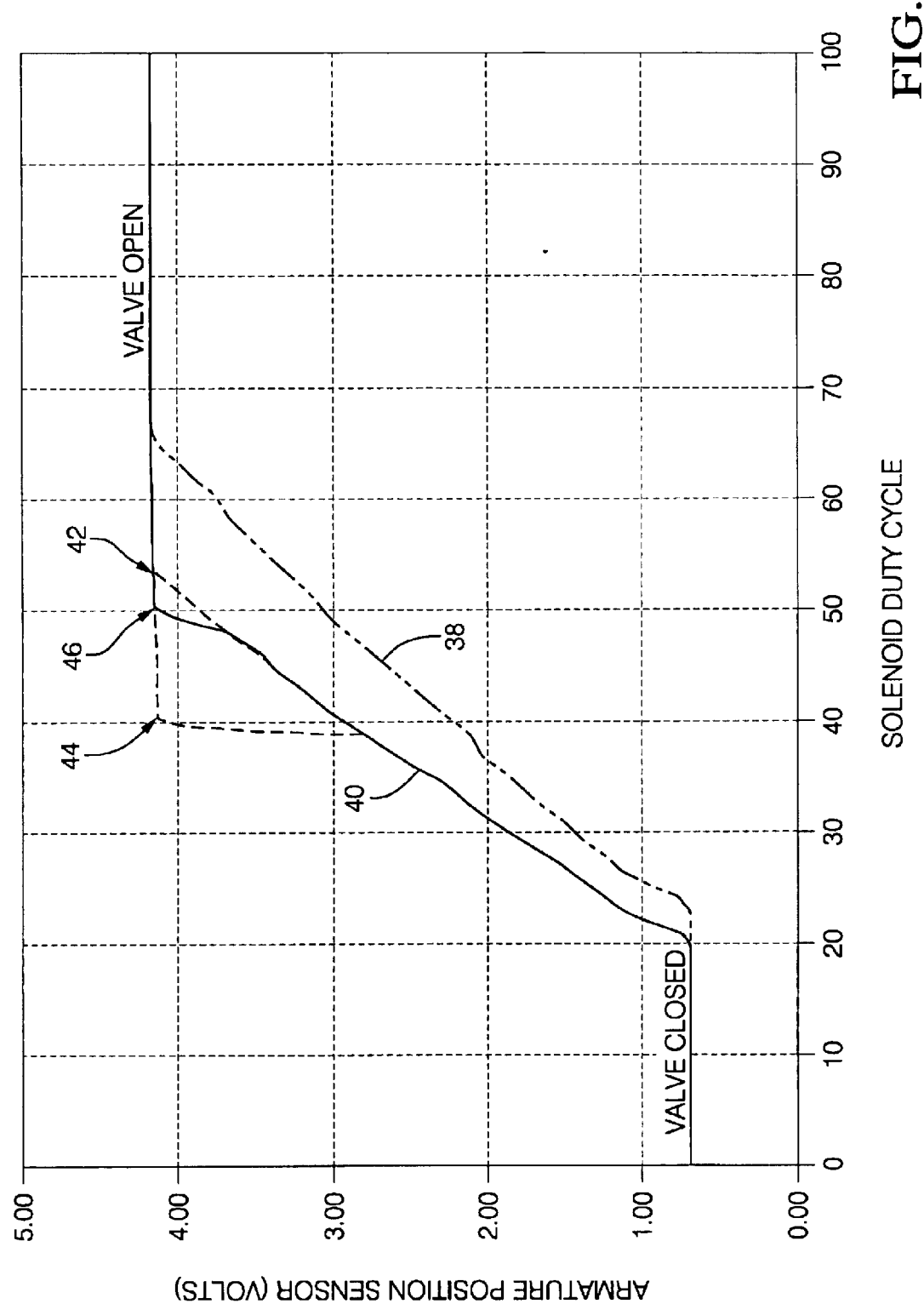
FIG. 2 is a graph showing the improvement in hysteresis provided by the invention.

Referring to FIG. 2, the position of sensor shaft 26, expressed in voltage output of the sensor system, is shown as a function of the electric duty cycle of the windings 16. In the valve-opening stroke of the armature, shown as curve 38, the valve remains closed until the return spring force is overcome at about 25% of the duty cycle. The armature then moves nearly linearly until the valve is fully open at about 65% of the duty cycle (armature in contact with the tube bottom). In the return stroke, hysteresis in decay of the electromagnetic field is shown in the fact that the valve-closing curve 40 is displaced to the left from the valve-opening curve 38. In addition, however, the armature is shown as experiencing difficulty in exiting the closed end of guide tube 20. Ideally, the armature would begin to move at point 42, about 53% of the duty cycle as extrapolated from curve 40. In fact, in a known prior art actuator, such movement may be delayed until point 44 at about 40% of the duty cycle, at which time the valve jumps almost instantaneously from fully open to nearly half closed, making position control unacceptably imprecise. In the same actuator, now equipped with a resilient element 36 in accordance with the invention, the armature begins to move at point 46, an improvement of about 70% from prior art point 44 to ideal point 42.

Figure 3:
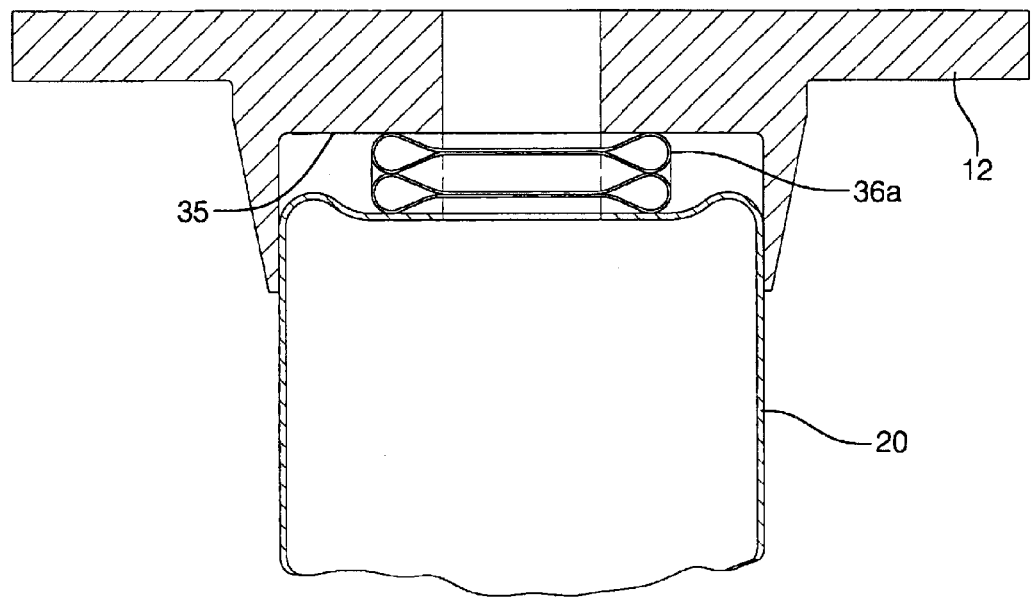
FIGS. 3 through 7 are elevational cross-sectional views of further embodiments in accordance with the invention.

Referring to FIG. 3, a resilient element 36a may be an undulating washer having a plurality of layers.

Figure 4:
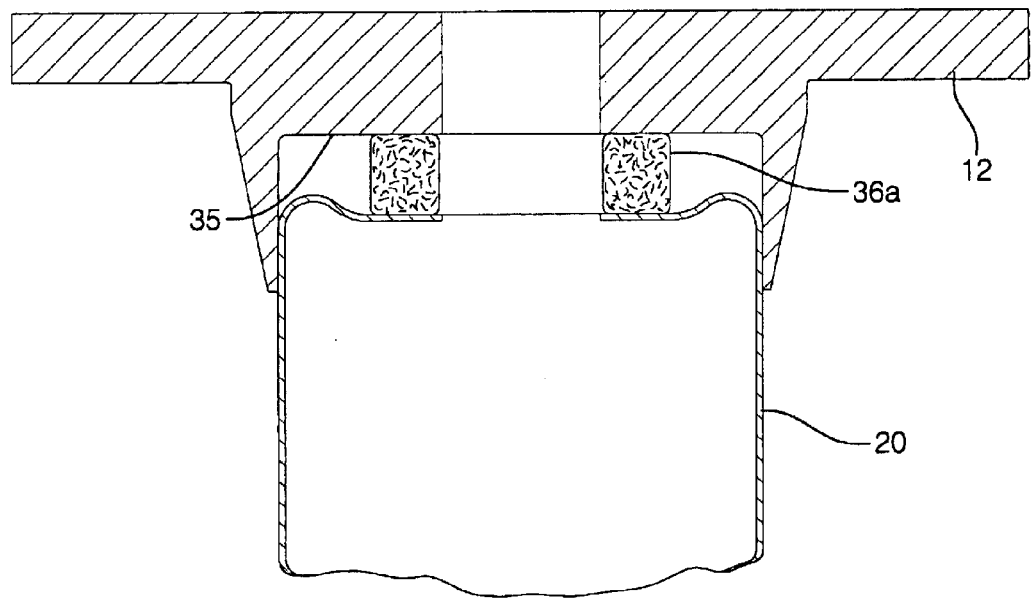
Figure 5:
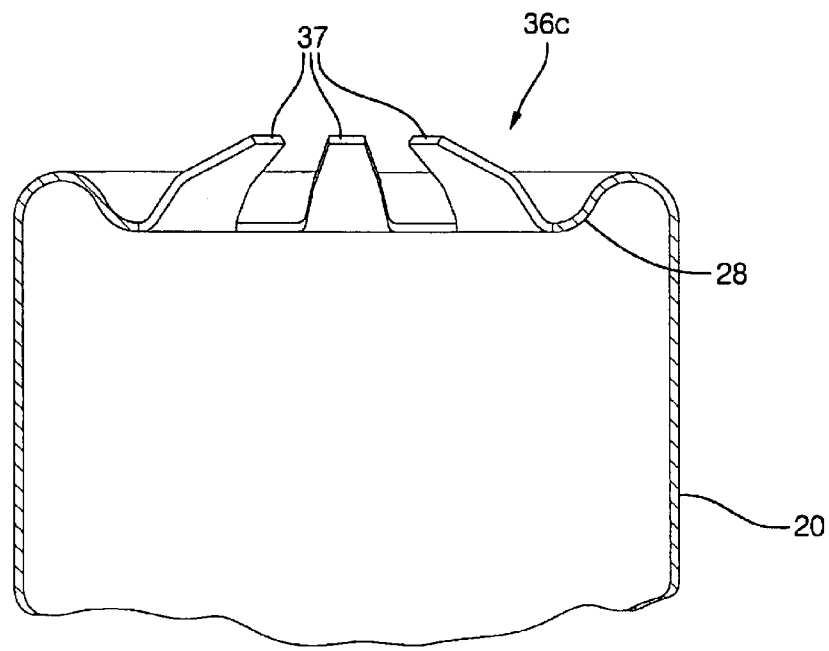

Referring to FIG. 4, a resilient element 36b may be an annular structure formed from a resilient metal mesh. Referring to FIG. 5, a resilient element 36c may be a radial leaf spring having a plurality of angularly spaced-apart radial leaves 37 formed as by punching in known fashion from bottom portion 28 of tubular guide 20.

Figure 6:
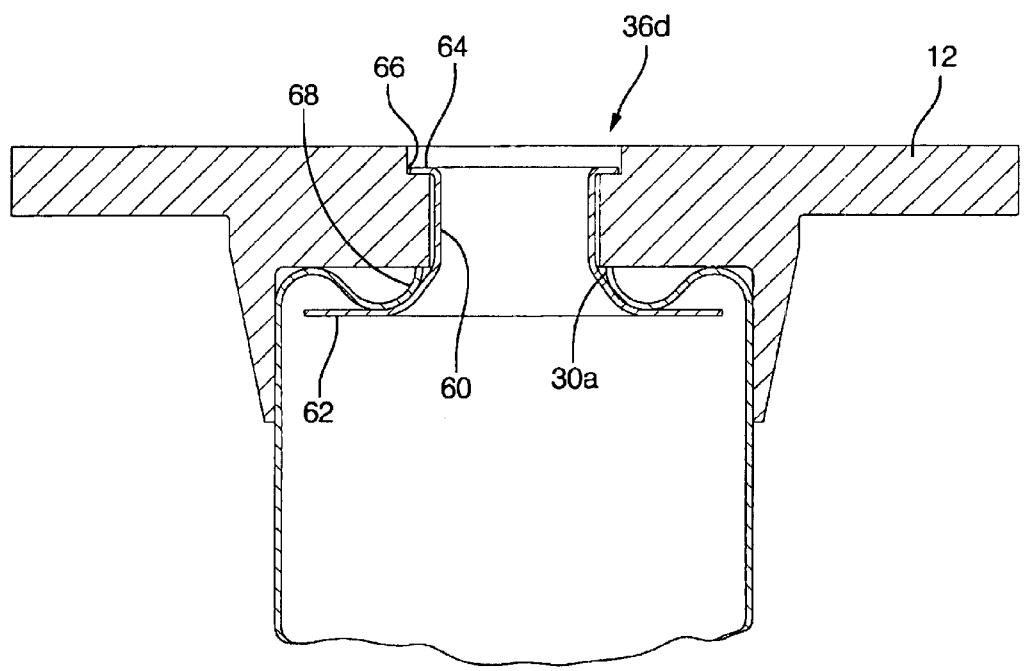

Referring to FIG. 6, a resilient element 36d may be a captive retaining sleeve 60 disposed in an opening 30a in bottom 28a, having a first flange 62 extending radially over a portion of bottom 28a for stopping armature 22 (not shown in FIG. 6), and having a second flange 64 extending radially over a step 66 formed in pole piece 12 for retaining sleeve 60. The margin of opening 30a is rolled to form an annular resilient lip 68 which cooperates with sleeve 60 to absorb the shock of armature impact.

Figure 7:
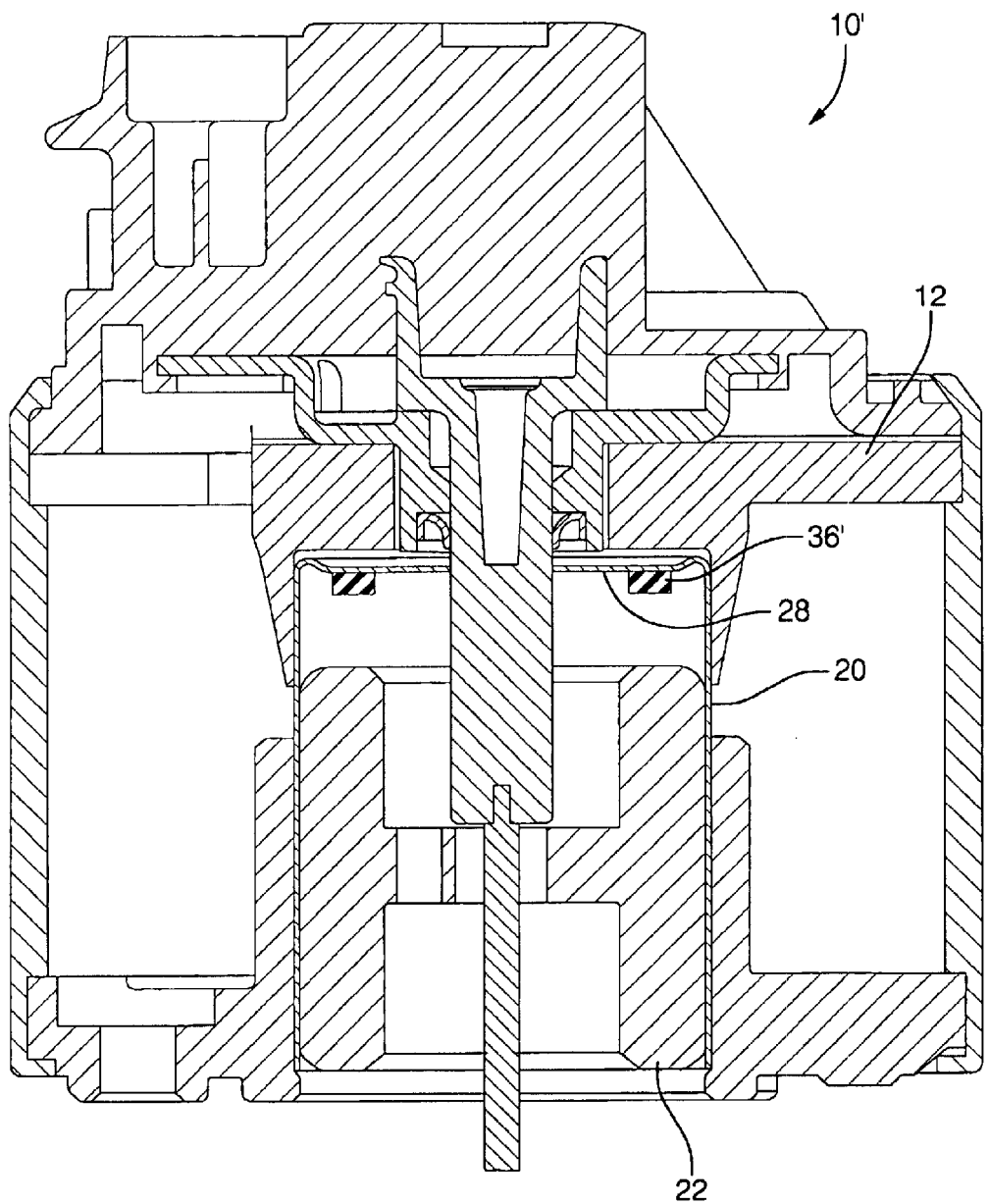

Referring to FIG. 7, embodiment 10' shows a resilient element 36' disposed within tube 20 against bottom portion 28. Although within the scope of the invention, this embodiment is not currently preferred. Such placement of element 36 meets the first two purposes described above but cannot prevent tube 20 from being moved axially by friction with, or the impact of, armature 22.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. In a solenoid actuator including a first magnetic pole piece, a second magnetic pole piece spaced apart axially from said first pole piece, a tubular armature guide disposed within said first and second pole pieces and having a bottom portion spaced apart from an axial face of said first pole piece, and an armature slidably disposed within said tubular armature guide, the improvement comprising:

a resilient element disposed between said axial face and said armature for absorbing the impact of said armature and for accelerating said armature away from said axial face.

2. An actuator in accordance with claim 1 wherein said resilient element is disposed between said bottom portion and said axial face.

3. An actuator in accordance with claim 1 wherein said resilient element is disposed between said bottom portion and said armature.

4. An actuator in accordance with claim 1 wherein said resilient element is formed as a Belleville washer.

5. An actuator in accordance with claim 1 wherein said resilient element is formed as an undulating washer.

6. An actuator in accordance with claim 5 wherein said undulating washer has a plurality of layers.

7. An actuator in accordance with claim 1 wherein said resilient element is formed as an annular structure from a resilient metal mesh.

8. An actuator in accordance with claim 1 wherein said resilient element is formed as a plurality of angularly spaced-apart radial leaves in said bottom portion.

9. An actuator in accordance with claim 1 wherein said resilient element includes a captive sleeve disposed in an opening in said bottom portion.

10. An exhaust gas recirculation valve assembly for an internal combustion engine, the assembly comprising a solenoid actuator including a first magnetic pole piece, a second magnetic pole piece spaced apart axially from said first pole piece, a tubular armature guide disposed within said first and second pole pieces and having a bottom portion spaced apart from an axial face of said first pole piece, an armature slidably disposed within said tubular armature guide, and a resilient element disposed between said axial face and said bottom portion for absorbing the impact of said armature against said bottom portion, for accelerating said armature away from said bottom portion.

* * * * *